Oct. 18, 1949.  R. STRUB  2,484,867
RESISTANCE TRANSFORMER FOR TRANSFORMING DIRECT
CURRENT INTO THREE-PHASE CURRENT
Filed Nov. 29, 1945
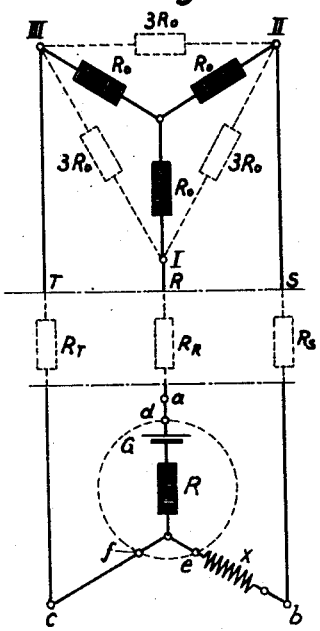
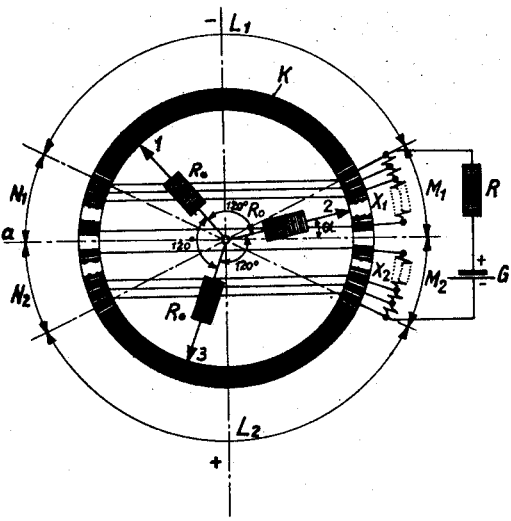
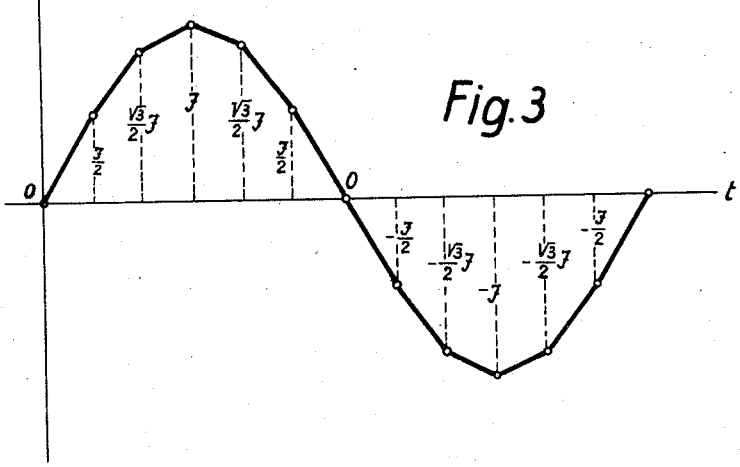
INVENTOR
Richard Strub
By Jackenbach Hirschman
ATTORNEYS Patented Oct. 18, 1949

2,484,867

UNITED STATES PATENT OFFICE 2,484,867

RESISTANCE TRANSFORMER FOR TRANSFORMING DIRECT CURRENT INTO THREE-PHASE CURRENT

Richard Strub, Zurich, Switzerland, assignor to Albiswerk Zurich Aktiengesellschaft, Zurich-Albisrieden, Switzerland, a company of Switzerland Application November 29, 1945, Serial No. 631,559½
In Switzerland January 14, 1944

Section 1, Public Law 690, August 8, 1946
Patent expires January 14, 1964

4 Claims. (Cl. 175—363)

Resistance transformers for transforming direct current into three-phase alternating current and vice versa are already known. One type of such transformers operates on the principle that three brushes rotate on an annularly wound closed resistance, which receives direct current at two opposite points. A collector is generally substituted for the annularly wound resistance (cf. for example K. Schmidt's article in ETZ 1942, p. 327). Another type operates on the principle that variable resistances are inserted in the three conductors to the three-phase load circuit and are periodically interchanged with respect to the phase and to the sign of the source of direct current in such a way that the total amount of current supplied by the source of direct current flows through the load network.

The present invention relates to a three-phase resistance transformer of the latter type, particularly suited for producing a three-phase alternating current of approximately sinusoidal wave form with small outlay for switching and construction and small losses in the transformer unit. This resistance transformer, in which direct current is transformed into three-phase alternating current by inserting in the three conductors to the three-phase networks variable resistances which are periodically interchanged with respect to the phase and to the sign of the source of direct current which flows through the network, is characterized in that a single variable resistance is alternately connected with only one of the three phases. This is summarily shown in Fig. 1 in which to terminals I, II, and III are connected conductors R, S, and T of a three-phase network. This may be a star connected network with phase resistances $R_0$ or delta connected with resistances $3R_0$ in series. Variable resistance X is inserted at a certain point, for example S, of one conductor (Fig. 1). By the periodic variation of this resistance and interchanging connections $a$, $b$, $c$, on the one hand, and connections $d$, $e$, $f$ on the other, the result is achieved that a three-phase current flows through system R, S, T. At any time two conductors are directly connected with the source of direct-current G. At the moment represented in Fig. 1 these are conductors R, T.

It is frequently advantageous not to connect the three phase conductors and appurtenant variable resistance $x$ directly with the source of direct current, but to do so indirectly over constant resistance R. When a resistance transformer is composed of ohmic resistances and is utilized as a three-phase generator with non-ohmic load, resistances $R_T$, $R_R$, $R_S$ are frequently inserted in the three phases R, S, T for the purpose of compensating the counter EMF. The insertion of resistance R before the source of direct current is equivalent to combining the three resistances $R_T$, $R_S$, $R_R$ into the one resistance R.

One embodiment of the resistance transformer according to the invention, in which a collector is employed, is exemplified and explained in Fig. 2.

In this embodiment three brushes 1, 2, 3 disposed at angles of 120° with respect to each other rotate on collector K. This collector consists, first, of two groups of commutator segments $L_1$, $L_2$ symmetrically arranged relatively to axis $a$ passing through the middle of the collector, such segments being connected and each of the groups comprising ⅓ of the total number of segments, secondly, of two groups of segments $M_1$, $M_2$ likewise symmetrically arranged in relation to axis $a$ and each comprising 1/12 of the total number of segments, and, thirdly, of two groups of segments $N_1$, $N_2$ placed symmetrically to groups $M_1$, $M_2$ relatively to axis $b$ perpendicular to axis $a$. The segments of groups $L_1$ and $L_2$ are short-circuited and can therefore each be replaced by a single homogeneous segment. The two groups of segments $L_1$ and $L_2$ are connected with source of direct current G over constant resistance R. The terminals of a first cascade resistance $x_1$, one end of which is connected with group of segments $L_1$, are connected with the segments of group $M_1$. The terminals of a second cascade resistance $x_2$, connected at one end with the segment group $L_2$, are connected with the segments of group $M_2$. Moreover, the segments of groups $M_1$ and $N_1$ arranged symmetrically with respect to axis $b$ are connected to each other, and the same applies to those of groups $M_2$ and $N_2$.

When the three brushes 1, 2, 3 rotate, two of the phases are always in direct connection over resistance R with source of direct-current G, while the third phase is connected with the source or direct current over partial resistance $x$ and resistance R. During a whole counterclockwise revolution, phase 2 receives positive potential in sector $M_1$ over variable resistance $x_1$ and constant resistance R. In the sector $L_1$ it receives positive potential only over the resistance R; in the sector $N_1$ it receives positive potential over the variable resistance $x_1$ and resistance R. It receives negative potential in sector $N_2$ over variable resistance $x_2$, in sector $L_2$ negative potential directly, and in sector $M_2$ also negative potential over variable resistance $x_2$. The same applies to phases 1 and 3 with a difference of phase of 120° and 240°, respectively. In the example chosen a collector has been used for combining the phases with regard to resistance and sign. But other known electrotechnical elements and arrangements, such as automatic telephone selectors or series of relays, may also be employed.

If E is the voltage of the source of direct current, J the maximum phase current (amplitude) and $\alpha$ the angle of phase 2, for example, with respect to axis $a$, the following equations obtain:

for $\alpha = 30°$ $$E = J \cdot R + 1.5 J \cdot R_0$$

for $\alpha = 60°$ $$E = \frac{\sqrt{3}}{2} J \cdot R + \sqrt{3} J \cdot R_0$$

and therefore $$R = R_0 \sqrt{3}$$

For $\alpha = 0°$, $30°$, $60°$, $90°$, etc., the current graph in Fig. 3 gives points 1, 2, 3, 4, etc. The graph also applies to the other two phases with a difference of phase displacement of 120° and 240° respectively. The portions of the curve lying between points 1, 2, 3, 4, etc., only approximate the sine wave-form; for example, by rectilinear segments as shown in Fig. 3. Resistance $x = x_1 = x_2$ must be chosen in such manner that from $\alpha = 0°$ to $\alpha = 30°$ it decreases uniformly from $\infty$ to 0.

In many technically interesting cases this approximation to the sine wave-form is sufficient, and the resistance transformer according to the invention affords considerable advantages. The current consumed by transformer resistances $x_1$, $x_2$ is very small. This small consumption permits the rotation of the collector with fixed brushes with small momentum of inertia and thus makes it possible to avoid the use of delicate rotating brushes. It also greatly simplifies the whole construction of the transformer and in particular the wiring. The insertion of constant resistance R in series with the source of direct current enables the three-phase current to be given the approximate sine form shown in Fig. 3. This resistance also serves to compensate for the counter-E. M. F.

I claim:

1. A rotary resistance transformer, for transforming direct current into three-phase current, in which in the three conductors to the three-phase load network variable resistances are inserted, which are periodically interchanged with respect to the phase and to the sign of the source of direct current, so that the total current delivered by the source of direct current flows through the load network, characterized in that a variable resistance is alternately connected with only one of the three phases.

2. A rotary resistance transformer according to claim 1 characterized in that the phase conductors with the appurtenant variable resistance are connected with the source of direct current over a constant resistance.

3. A rotary resistance transformer according to claim 2, in which three brushes set at angles of 120° to each other rotate on a collector comprising two groups of segments placed symmetrically with respect to an axis passing through the middle of the collector, said segments being connected with each other and each of said groups containing $\frac{1}{3}$ of the total number of segments, two additional groups of segments likewise symmetrically disposed with respect to said axis, each of such additional groups containing $\frac{1}{12}$ of the total number of segments, and two further groups of segments disposed symmetrically to the second mentioned groups with respect to an axis perpendicular to the first mentioned axis, the first mentioned groups of segments being connected with the source of direct current over the constant resistance, and a first cascade resistance, one end of which is connected to one of the first mentioned groups of segments, and having terminals connected with the segments of one of the second mentioned groups of segments, and a second cascade resistance, one end of which is connected with the other of the first mentioned groups of segments, and having terminals connected with the segments of the other of the second mentioned groups of segments, the segments of said one of the second mentioned groups and those of one of the third mentioned groups being arranged symmetrically with respect to the second mentioned axis and being mutually connected, and likewise the segments of the others of said second mentioned and third mentioned groups.

4. A rotary resistance transformer according to claim 2, in which three brushes set at angles of 120° to each other rotate on a collector comprising two groups of segments placed symmetrically with respect to an axis passing through the middle of the collector, said segments being connected with each other and each of said groups containing $\frac{1}{3}$ of the total number of segments, two additional groups of segments likewise symmetrically disposed with respect to said axis, each of such additional groups containing $\frac{1}{12}$ of the total number of segments, and two further groups of segments disposed symmetrically to the second mentioned groups with respect to an axis perpendicular to the first mentioned axis, the first mentioned groups of segments being connected with the source of direct current over the constant resistance, and a first cascade resistance, one end of which is connected to one of the first mentioned groups of segments, and having terminals connected with the segments of one of the second mentioned groups of segments, and a second cascade resistance, one end of which is connected with the other of the first mentioned groups of segments, and having terminals connected with the segments of the other of the second mentioned groups of segments, the segments of said one of the second mentioned groups and those of one of the third mentioned groups being arranged symmetrically with respect to the second mentioned axis and being mutually connected, and likewise the segments of the others of said second mentioned and third mentioned groups, the first mentioned groups of segments distributed symmetrically with respect to the first-mentioned axis being connected to the source of direct current by way of a resistance having the value $R_0 \cdot \sqrt{3}$, $R_0$ being a load resistance of the symmetrically star-connected load of the transformer.

RICHARD STRUB.

REFERENCES CITED

The following references are of record in the file of this patent:

UNITED STATES PATENTS

| Number | Name | Date |
|--------|------|------|
| 581,091 | Wappler | Apr. 20, 1897 |
| 899,629 | Shoemaker | Sept. 29, 1908 |
| 982,930 | Bliss | Jan. 31, 1911 |
| 1,003,676 | Wantz | Sept. 19, 1911 |
| 1,051,941 | Woodbridge | Feb. 4, 1913 |
| 1,691,986 | Nyquist | Nov. 20, 1928 |